United States Patent
Belling et al.

(10) Patent No.: US 10,814,666 B2
(45) Date of Patent: Oct. 27, 2020

(54) METHOD OF MANUFACTURING FOIL STAMPED ARTWORK

(71) Applicant: Minted, LLC, San Francisco, CA (US)

(72) Inventors: Sean Belling, Oakland, CA (US); Tonia Misvaer, Muir Beach, CA (US); Nathan Glynn, Oakland, CA (US)

(73) Assignee: MINTED, LLC, San Francisco, CA (US)

( * ) Notice: Subject to any disclaimer, the term of this patent is extended or adjusted under 35 U.S.C. 154(b) by 520 days.

(21) Appl. No.: 15/807,657

(22) Filed: Nov. 9, 2017

(65) Prior Publication Data

US 2018/0065401 A1   Mar. 8, 2018

Related U.S. Application Data

(62) Division of application No. 14/696,739, filed on Apr. 27, 2015, now Pat. No. 9,844,975.

(51) Int. Cl.
   *G06F 3/12*   (2006.01)
   *B44C 1/14*   (2006.01)
   *B44C 1/17*   (2006.01)

(52) U.S. Cl.
   CPC .............. *B44C 1/14* (2013.01); *B44C 1/1716* (2013.01); *B44C 1/1729* (2013.01); *G06F 3/12* (2013.01); *G06F 3/1208* (2013.01); *G06F 3/1256* (2013.01); *G06F 3/1257* (2013.01); *G06F 3/1285* (2013.01)

(58) Field of Classification Search
   None
   See application file for complete search history.

(56) References Cited

U.S. PATENT DOCUMENTS

2005/0257594 A1* 11/2005 Hutchison ............ B26D 7/2614
                                                72/482.93

OTHER PUBLICATIONS

Ricoh Company, Ltd., "TotalFlow MR Operating Instructions User's Guide" [online] (2012) [Retrieved on Oct. 11, 2017), retrieved from the internet: http://support.ricoh.com/bb vloi/pub e/oi/0001044/0001044/VD5618521B/D5618521B.pdf: see entire document, especially pp. 11-13, 88-89 (Year: 2012).*

* cited by examiner

*Primary Examiner* — Monica A Huson
*Assistant Examiner* — Kelsey C Grace
(74) *Attorney, Agent, or Firm* — Jones Day (57) ABSTRACT

A method includes storing a design in a database. The design includes (i) a print component and an inner crop mark that are configured to be printed, and (ii) a foil component configured to be foil-stamped. The method further includes storing a foil-press die that is embossed with both the foil component and a foil alignment mark. The foil alignment mark is configured to be aligned with the inner crop mark.

19 Claims, 6 Drawing Sheets

METHOD OF MANUFACTURING FOIL STAMPED ARTWORK

CROSS-REFERENCE TO RELATED APPLICATIONS

This is a divisional of U.S. application Ser. No. 14/696,739, filed Apr. 27, 2015, hereby incorporated herein by reference.

TECHNICAL FIELD

This relates to marketing and preparing user-customized artwork that include a foil stamped design component.

BACKGROUND

Artwork, such as art prints, may incorporate a design with a printed component and a foil stamped component. These products may be marketed to customers via a graphical user interface (GUI).

SUMMARY

A method includes storing, in a database, different design templates. Each template includes (i) a print component configured to be printed and (ii) a foil component configured to be foil-stamped. The print component of each design template is associated with inner crop marks and outer crop marks. The foil component of each template is associated with alignment marks that are configured to be aligned with the inner crop marks for the respective template. Both the foil component and the foil alignment marks are embossed on a foil-press die.

DETAILED DESCRIPTION

Figure 1:
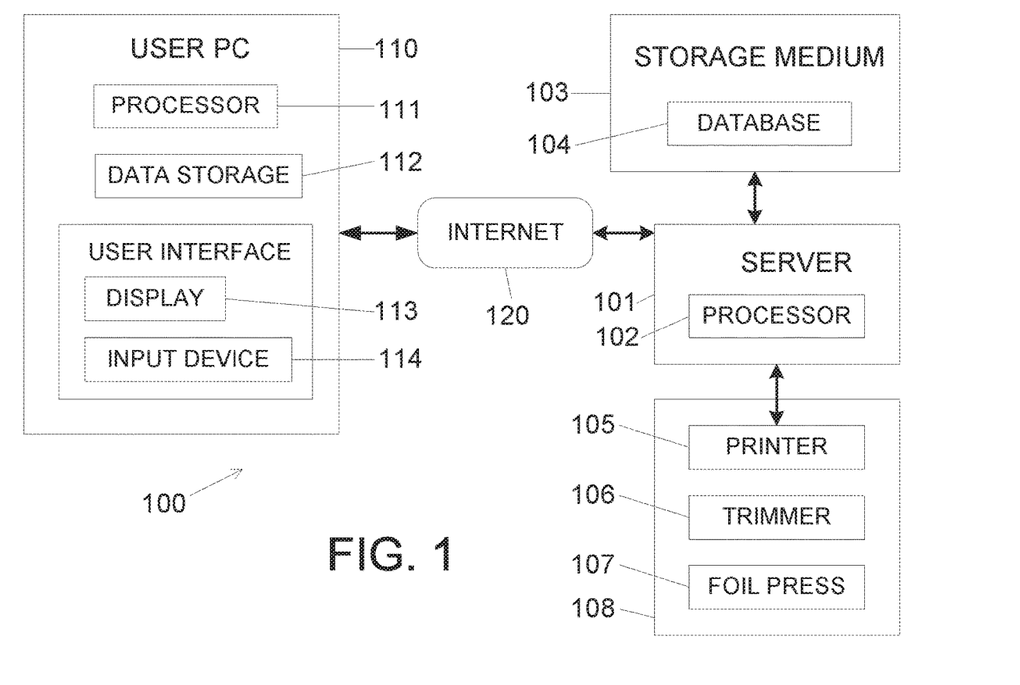
FIG. 1 is a block diagram of an example system for marketing and manufacturing artwork incorporating a design that has a customizable print component and a non-customizable foil stamped component".
Figure 2A:
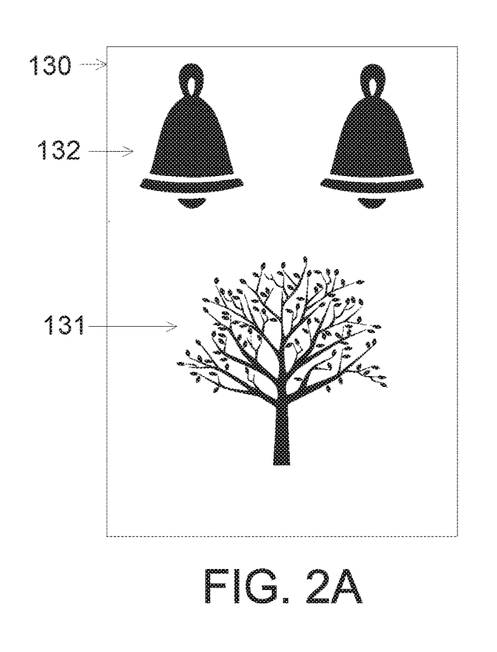
FIG. 2A shows an example design template comprising an initial version of the design.
Figure 2B:
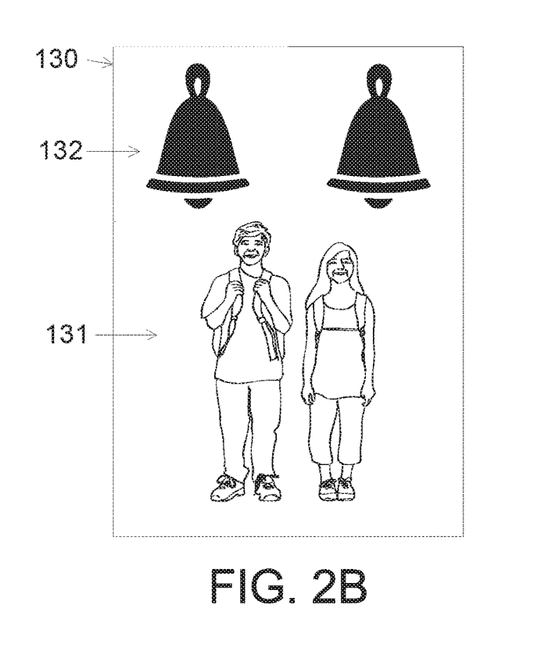
FIG. 2B shows an example of the design created by a user customizing the template of FIG. 2A.

FIG. 1 is a block diagram of an example system 100 for marketing and manufacturing foil-stamped artwork products. The system 100 provides a graphical user interface (GUI) through which a customers may (i) select a design template and (ii) customize the template to generate a final design for the artwork. FIG. 2A shows an example template 130 before customization. The template 130 includes a print component 131 and a foil-pressed component 132. FIG. 2B shows an example of how the final design might appear after customization. The final design includes the print component 131, customized by the user, and the foil component 132 that is not customizable by the user. Using the system 100, the design's print component 131 is printed onto sheet stock material to yield a printed sheet (piece). The sheet is trimmed, stamped with the design's foil component 132, and then trimmed again to yield an artwork product with the final design 130.

The system 100 includes a non-transitory hardware server 101 that has at least one processor 102. The processor 100 executes program instructions of software code. The code is stored on a non-transitory hardware computer readable data storage medium 103 to implement both the GUI and steps of manufacturing the product. The storage medium 103 may be a computer hard drive device of the vendor.

The GUI is used by the customer (user) to select and customize an ornamental design for an artwork product. The server 101 outputs the user-customized design to a printer 105, such as an inkjet printer, which prints the design onto printable sheet stock material to yield a printed (printout) sheet. The sheet is trimmed (cropped) on a trimmer 106. The trimmed sheet is foil-pressed (foil-stamped) on a foil press 107 (foil stamping machine). Then, the sheet is trimmed again on the trimmer 106. This yields the final artwork product ready to be shipped to the user.

The system 100 may be implemented by a vendor (manufacturer) of printed artwork products. The server 101 may host a website associated with the vendor that provides the GUI. The printer 105, the trimmer 106 and the foil press 107 may be located in a production facility 108 of the vendor.

The GUI may be provided on a user's computing device 110. Examples of user computing devices are a personal computer (PC) and a mobile communication device such a smart phone. Each user device 110 has a processor 111 and a data storage medium 112. It also has a user interface that includes a display screen 113 and a user input device 114. The input device 114 may include a mouse, a keypad and a touch-screen for inputting user entries. The user device may communicate through a network such as the Internet 120 with the web server 101 that implements the website GUI. Alternatively, some or all of the software code for implementing the GUI may be stored in the data storage medium 112 of the user device 110 and executed by the user device's processor 111, such that a server or network connection is unnecessary for selecting and customizing the design by the user.

Examples of the artwork products are art prints, business cards, posters, fliers, brochures, stationery, calendars, event invitations (e.g., for weddings and parties), personal journals (with a decorative cover and blank inner pages for writing in), and greeting cards. These products can be printed by a printer, trimmed by a cutter and stamped by a foil press. Examples of the sheet stock (flat printable stock material)

are paper or paper-like material, such as card stock and art paper. Other example of the sheet stock are flat board, such as poster board (display board) and foam core.

Examples of the trimmer 106 (paper cutter; board cutter) are a guillotine cutter and a rotary cutter (with a wheel-shaped blade). The trimmer 106 may include a movable cutter (e.g., guillotine blade or wheel-shaped blade) and a leveling guide rail, both attached to a flat base.

The foil press 107 may include the following components: A paper tray holds a stack of sheets. A gripper moves each sheet, in turn, from the tray to a flat platen. A film (e.g., mylar) is positioned in front of the sheet. The film supports a metal foil that is coated with a heat-activated adhesive. The die is secured to, and heated by, a die plate. The die plate pushes the die forward, squeezing the film and foil between the die and the sheet. The heat activates the adhesive to adhere portions of the foil to the sheet. When the die is retracted, the mylar film is released from the sheet, leaving the portions of the foil adhered to the sheet.

Figure 3:
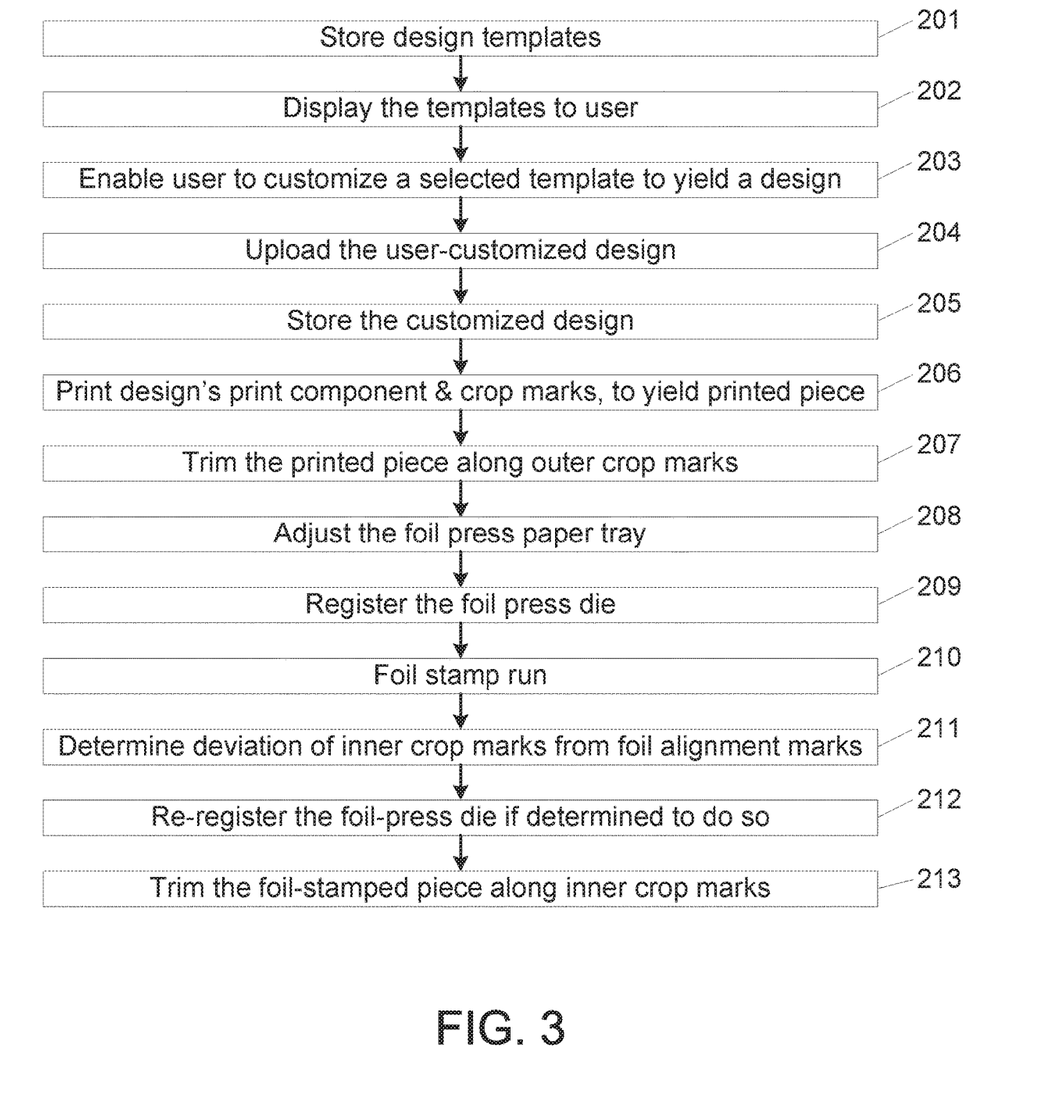
FIG. 3 is a flow chart of a method, implemented by the system, for marketing and manufacturing the artwork.

FIG. 3 is a flow chart of example method steps performed by the system 100. The steps of this method are explained as follows:

Design templates (such as shown in FIG. 2A) are stored in a database 104 of the storage medium 103 (step 201) with related data. For each template, the data may include a stock image, a stock greeting, a stock message to follow the greeting, and a stock color to accompany the template. The data may further include information regarding inner and outer crop marks (described later). This information specifies how the crop marks will appear when printed along with the design's print component 131. The database 104 may also store images and text provided by the users to be added to the templates (e.g., in place of the stock components) that the users selected.

The GUI may input a user selection of an artwork product type (e.g., art print, greeting card, business card). The GUI may then display (step 202), to the user, different templates relating to the selected product type. The GUI inputs a user selection of one of the displayed templates.

The user may use the GUI to customize the print component 131 of the template (step 203) to yield a graphic (artwork) design. The customization may include uploading one or more images to be included in the template. The customization may further entail modifying features (e.g., font, text wording, text color, background color) of the print component 131. The server 101 may upload the user-customized design via the GUI (step 204). In the example of FIGS. 2A-2B, the user-customization entails replacing the template's stock photo of a tree in the print component 131 with a user-uploaded photograph of children, while the foil component 132 remains unchanged.

As user-customized designs (customer orders) are received by the server 101 over the course of time (such as over the course of hours), the server 101 may store (step 205) the received customized designs for later printing.

The server 101 may accumulate the orders, for different templates from different customers, until the accumulation of a threshold number of design orders sharing (based on) a common template or a common foil-press die. Then, all designs that share the common template or common foil-press die are sent by the server 101 to the printer 105, along with the crop marks associated with the template. The designs, with their crop marks, are printed (step 206) at the same time, one after the other in a batch, without interleaving the print run with designs based on other dies.

The printer 105 prints the print component 131 of the design onto sheet stock material, to yield a printed sheet. The sheet stock may be fed into the printer 105 from a continuous roll and then cut into the sheets (one sheet per printout item). Or the sheet stock may be fed into the printer 105 in the form of a flat sheet. The flat sheet may contain multiple designs from multiple customers, which are later cut apart to separate the printed sheets from each other. Or the flat sheet may be sized to hold just one printed sheet per sheet.

Figure 4:
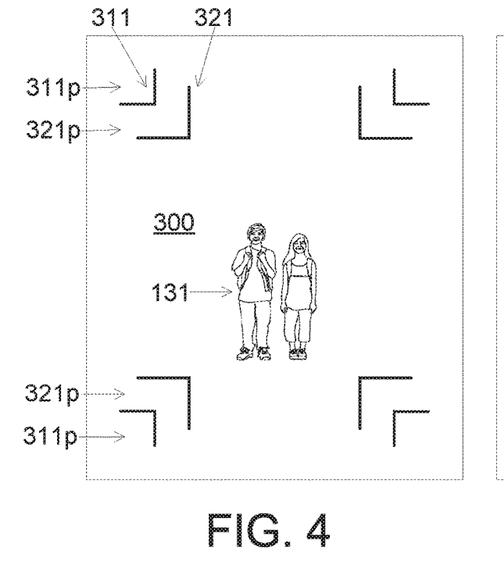
FIG. 4 is an example printed sheet, created by printing the customized design's print component onto sheet stock, the printed sheet including inner and outer crop marks.

FIG. 4 shows an example printout (printed) sheet 300. The printed sheet includes the design's print component 131 that the customer customized. The printed sheet 300 also includes a set of printed outer crop marks 311 and a set of printed inner crop marks 321. The outer crop marks include four pairs 311p of lines. Similarly, the inner printed crop marks 321 include four pairs 321p of lines. For each template, the database 104 stores the configuration of the respective template's crop marks 311 and 321.

Figure 5:
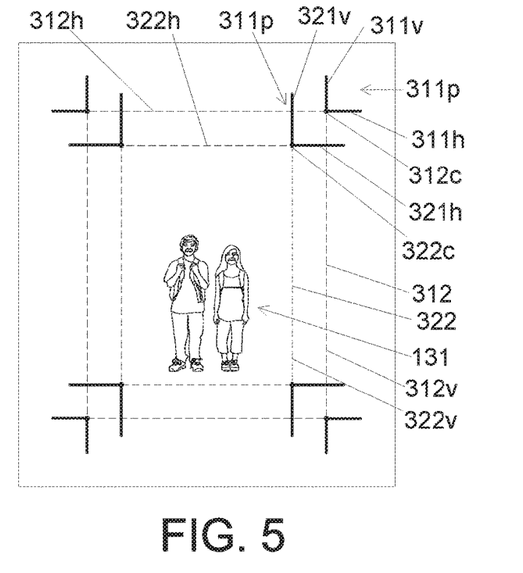
FIG. 5 is a view similar to FIG. 4, with additional markings that illustrate geometric aspects of the inner and outer crop marks.

As shown in FIG. 5, the outer crop mark pairs 311p are respectively positioned adjacent four imaginary corners 312c (corner points) of an imaginary outer rectangle 312. Accordingly, the four outer crop mark pairs 311p include an upper-left pair, an upper-right pair, a lower-left pair, and a lower-right pair. Each outer crop mark pair 311p includes a vertical line 311v that is collinear with an adjacent vertical edge 312v of the imaginary outer rectangle 312 and that extends away from the adjacent vertical edge 312v. Each outer crop mark pair 311p further includes a horizontal line 311h that is collinear with an adjacent horizontal edge 312h of the imaginary outer rectangle 312 and extends away from the adjacent horizontal edge 312h.

Similarly, the inner crop mark pairs 321p are respectively positioned adjacent four imaginary corners 322c (corner points) of an imaginary inner rectangle 322. Accordingly, the four inner crop mark pairs 321p include an upper-left pair, an upper-right pair, a lower-left pair, and a lower-right pair. Each inner crop mark pair 321p includes a vertical line 321v that is collinear with an adjacent vertical edge 322v of the imaginary inner rectangle 322 and that extends away from the adjacent vertical edge 312v. Each inner crop mark pair 321p further includes a horizontal line 321h that is collinear with an adjacent horizontal edge 322h of the imaginary inner rectangle 322 and extends away from the adjacent horizontal edge 322h. The outer imaginary rectangle 312 surrounds the inner imaginary rectangle 322, which itself surrounds the design's print component 131.

All crop mark lines 311h, 311v, 312h, 312v are in-line with (extend along an imaginary line that contains) two of the imaginary corner points 312c, 322c.

Figure 6:
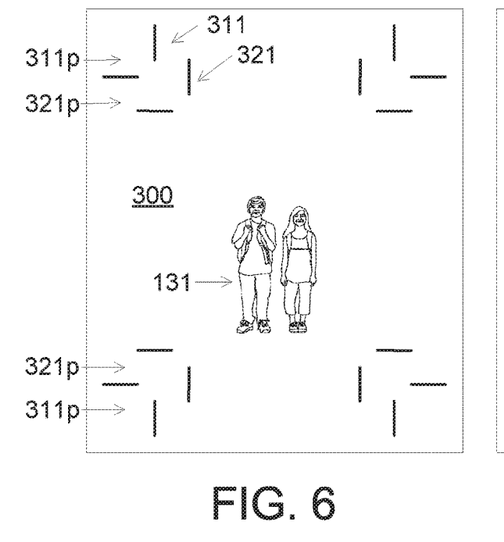
FIGS. 6-7 are views similar to FIGS. 4-5, showing a different configuration for the inner and outer crop marks.
Figure 7:
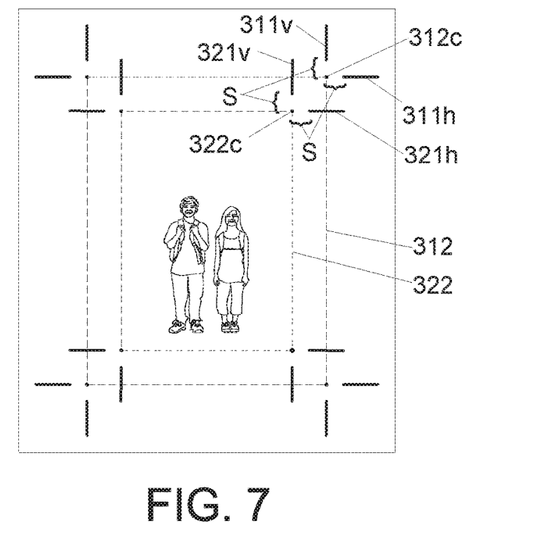

In the example of FIGS. 5-6, the crop mark lines 311h, 311v, 312h, 312v extend outward from the imaginary corner points 312c, 322c. Alternatively, any of the crop mark lines may be spaced away from the respective imaginary rectangle corners 312c, 322c. For example, in an embodiment of FIGS. 6-7, all of the crop mark lines 311h, 311v, 312h, 312v are spaced away from the imaginary rectangle corners 312c, 322c by a spacing S.

Figure 8A:
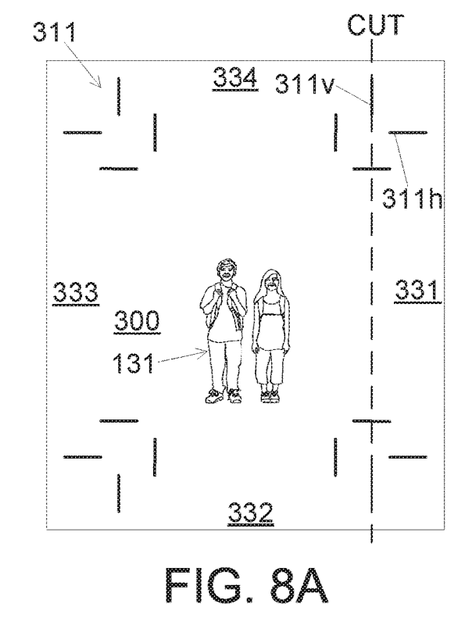
FIGS. 8A-8D show the example printed sheet at different stages in an initial trimming procedure.
Figure 8B:
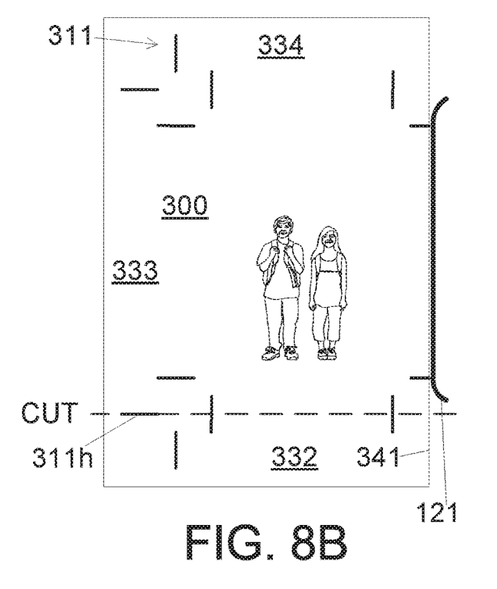

In step 207, each printed sheet 300 is trimmed along (guided by; based on) the outer crop marks 311. This results in the sheet 300 being properly sized to match the foil press' paper tray and for the design's foil component 132 to be pressed into the correct location on the sheet 300. With reference to FIG. 8A-8D, the trimming includes cutting off up to four peripheries 331, 332, 333, 334 from the sheet 300. One example of trimming (cropping) is as follows:

Using the trimmer 106, the first periphery 331 is trimmed off (along imaginary dashed "CUT" line) along two of the outer crop mark lines 311v. This leaves the sheet 300 appearing as shown in FIG. 8B, with the sheet having a new first edge 341.

Figure 8C:
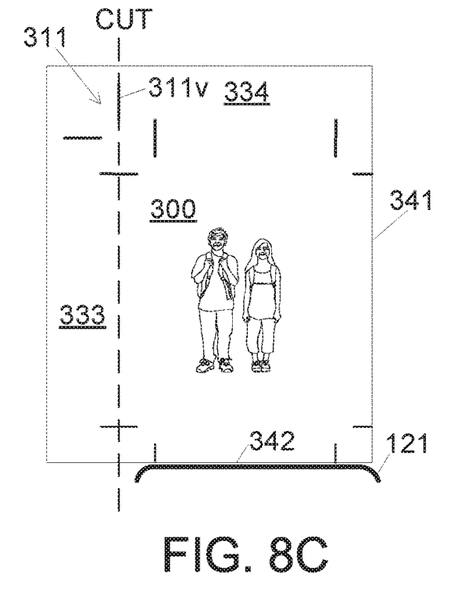

Then, the new first edge 341 is held flush against the trimmer's leveling guide rail 121 (FIG. 8B), and the second periphery 332 is trimmed off (along imaginary dashed "CUT" line) along an outer crop mark line 311. This leaves the sheet 300 appearing as shown in FIG. 8C, with the sheet having a new second edge 342.

Figure 8D:
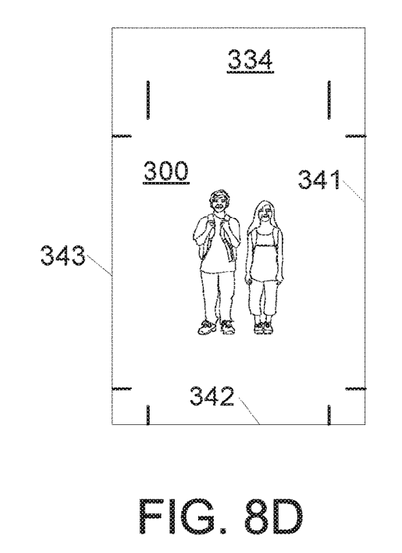

Then, the new second edge 342 is held flush against the trimmer's guide edge 121 (FIG. 8C), and the third periphery 333 is trimmed off (along imaginary dashed "CUT" line) along an outer crop mark line 311. This leaves the sheet 300 as shown in FIG. 8D, with the sheet having a new third edge 343.

Then, the fourth periphery 334 may be trimmed off by holding the first or third new edge 341, 342 flush against the trimmer's leveling guide edge 121, and trimming off the fourth periphery 334 at a location that renders the sheet a predetermined length (as measured from the second new edge 342 to a fourth new edge not shown). Alternatively, not all four peripheries might need to be removed. For example, only the first and second peripheries, or only the first, second and third peripheries might be removed.

In step 208, one or more walls of the foil press' paper tray (paper bin) are adjusted to match the dimensions of the trimmed printed sheet 300. The tray may include a right-side wall, a bottom wall and a left-side wall, respectively configured to abut the right, bottom and left edges 341, 342, 343 of the printed sheet 300 to keep the sheet properly positioned. And the position of one or more of these walls may be adjusted in step 208.

Figure 9:
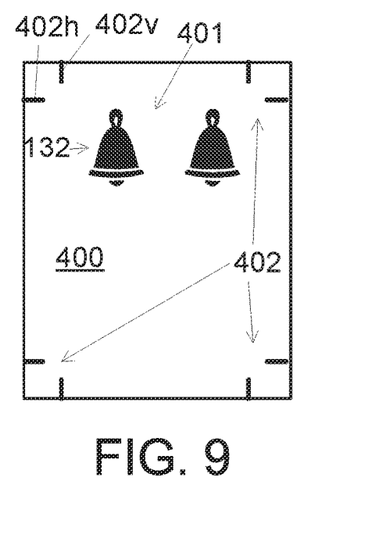
FIG. 9 is a front view of a foil press die for producing the foil press component of the design.

Step 209 is a die registration ("make ready") procedure in which the position of a die of the foil press is adjusted so that the design's foil component will be properly positioned relative to the designs print component 131. As shown in FIG. 9, the die 400 has one or more bosses (protrusions) 401 in the form of the foil component 132 of the user-customized design. The die 400 also has other bosses in the form of foil alignment marks 402, consisting of vertical lines 402v and horizontal lines 402h. This foil lines may be shaped like, or similar to, the printed inner marks 321v, 321h. The foil marks 402 are configured to be aligned with the inner crop marks 321. For example, the foil marks 402 may be configured to overlie (coincide with) the inner crop marks 321, for each foil line 402v, 402h to be superimposed onto (coincide with; align with) a corresponding printed line 321v, 321h.

Figure 10:
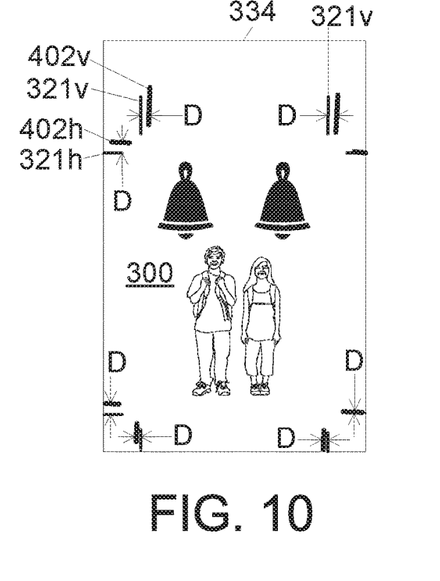
FIG. 10 is an of how the printed sheet might appear after being foil stamped using the die of FIG. 9 before the die is properly registered.

To register the die 400, the die 400 for the respective design's template is affixed to the foil press. The press' paper tray is filled with (preferably identical) "blanks", which are sheets that are imprinted (by the printer 105) with the inner crop marks 311. In this example, the blanks are multiple copies of one of the user-customized designs. Alternatively, the blanks might include only the template of the customer's design or only the inner crop marks of the template of the customer's design. In this registration procedure, one blank is foil-stamped with the die 400. This may result in the sheet appearing as shown in FIG. 10. Deviations (illustrated in FIG. 10 as distances D) between the foil lines 402 and corresponding printed lines 321 are determined (measured). The die 400 is then adjusted to minimize this deviation. This step, of determining and adjusting, is repeated with successive blanks until the deviation is reduced to zero or an insignificant amount (e.g., less than a predetermined threshold). At that point, the foil-stamp marks 403 and the printed inner marks 321 coincide.

In this die-registration procedure, the deviation determination might include vertical deviations (distances) between adjacent horizontal lines 321h, 402h and horizontal deviations between adjacent vertical crop lines 321v, 402v. The measurements might be direction-sensitive. For example, a distance value might be positive for a foil line 402 above or rightward of a corresponding print line 321, and be negative for a foil line 402 below or leftward of a corresponding print line 321.

The measured deviations might include an angle (angular deviation), indicative of gradual rotation of the die 400. The angular deviation might be determined based on amount of deviation (distance) between different horizontal lines (between lines 321h and 402h) or deviation between different vertical lines (between line 321v and 402v). For example the angular deviation might be calculated as a function of difference (taking sign into account) between horizontal distances D and difference between vertical distances D.

The die 400 may then be moved horizontally based on the horizontal deviations D, and moved vertically based on the vertical deviations D, and rotated based on the determined angular deviation.

The measured deviation values (distances and angle) might be compared to respective predetermined horizontal, vertical and angular deviation thresholds to determine whether the deviation is insignificant.

The deviation determination might be performed by a manual measurement that yields measured values for distance and angle, such as by a worker using a ruler. Or might be performed by automated measurement, such as by a scanner scanning the sheets into a computer (such as the server 101) and the computer distinguishing the foil marks 402 from the printed inner marks 321 and measuring distances and angles between them. Or might be performed visually, such as by a worker visually noting a deviation and moving the die to minimize the deviation, without obtaining a measured deviation value.

In the above example, the registration procedure, for ensuring that the foil component will be properly positioned relative to the printed component, is performed by adjusting the position of the die. Alternatively, the registration may be formed by adjusting the position of another part of the foil press, such as the paper tray, to achieve the same result (of properly positioning the foil component relative to the printed component).

Step 210 is a foil stamping run. The batch of the printed sheets 300 is loaded into the foil press' paper tray. The printed sheets may have different user-customized designs and may be from different customers, but they share the same die 400 and preferably are based on the same template. The die 400 stamps the foil design 132 onto each printed sheet 300.

Step 211 is performed during the foil stamp run. This step entails checking for occurrence of the foil component 132 drifting out of alignment relative to the printed component 131. During the foil stamping run, the precision of alignment of the foil marks 402 onto the printed inner marks 321 is determined (measured). The determination may be performed on each sheet 300 immediately after it is stamped, or after every n sheets have been stamped. The number n might be, for example, in the range five through ten. The deviation determination for each sheet being measured might be performed before a subsequent sheet 300 is stamped. The deviation determination may be performed as described above for initially registering the die (step 209).

In step 212, if an absolute value of any of the deviations (horizontal, vertically or angular) is found to be significant (e.g., exceeds a respective threshold), then the position of the die 400 is adjusted to minimize the deviation, and the run is continued. Even when the deviation warrants adjusting the die before continuing the stamping run, the previously stamped sheets may still be within specification (spec) and need not be discarded. That is because checking for die misalignment is performed sufficiently often, and the die is re-aligned before the deviation renders the product out-of-spec.

Figure 11A:
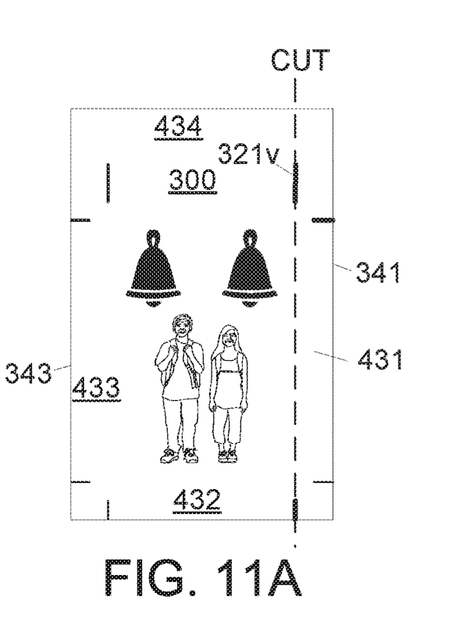
FIG. 11A shows how the printed sheet might appear after being foil stamped using the die of FIG. 9 after the die is properly registered.
Figure 11B:
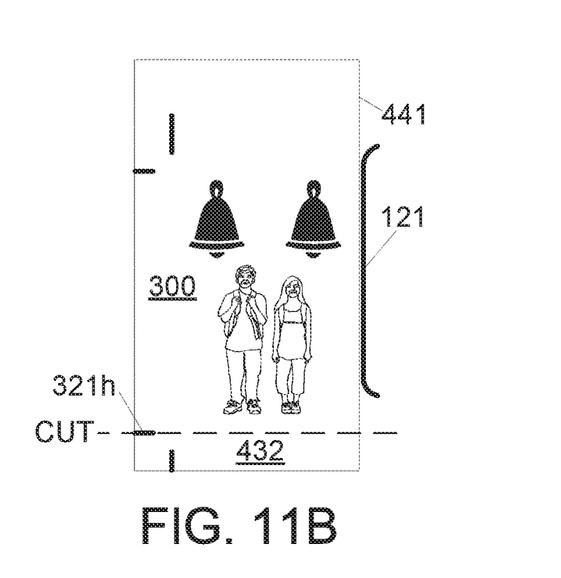
FIGS. 11B-11E show the printed-and-stamped sheet at different stages in a final trimming procedure.

In step 213, each printed sheet is trimmed along (guided by; based on) the inner crop marks 221. The procedure may be similar to the procedure (step 207) for trimming along the outer crop marks. One example of trimming (cropping) is as follows:

With reference to FIGS. 11A-11D, the trimming may include trimming off four peripheries 431, 432, 433, 434 from the sheet 300. One example of trimming (cropping) is as follows:

Using the trimmer 106, the first periphery 431 is trimmed off (along imaginary dashed "CUT" line) along two of the inner crop mark lines 321*v*. This leaves the sheet 300 appearing as shown in FIG. 11B, with the sheet 300 having a new first edge 441.

Figure 11C:
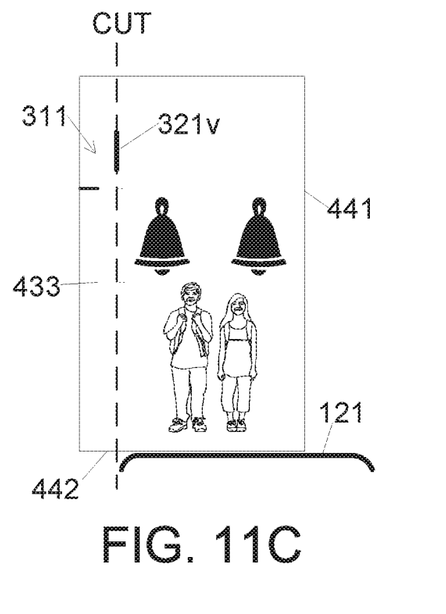

Then, the new first edge 441 is held flush against the trimmer's leveling guide rail 121 (FIG. 11B), and the second periphery 432 is trimmed off (along imaginary dashed "CUT" line) along an inner crop mark line 321*h*. This leaves the sheet 300 appearing as shown in FIG. 11C, with the sheet 300 having a new second edge 442.

Figure 11D:
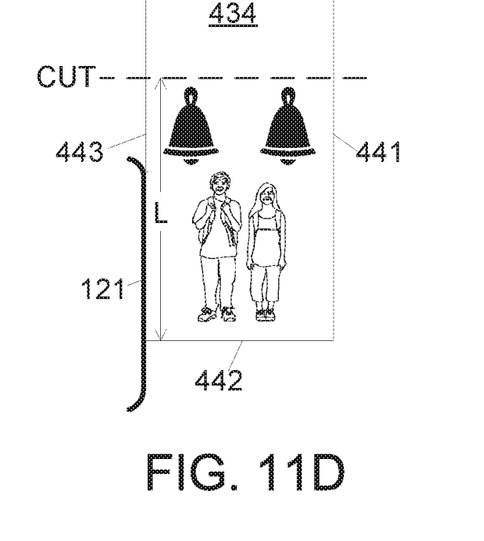

Then, the new second edge 442 is held flush against the trimmer's guide edge 121 (FIG. 11C), and the third periphery 433 is trimmed off (along imaginary dashed "CUT" line) along an outer crop mark line 321*v*. This leaves the sheet 300 as shown in FIG. 11D, with the sheet 300 having a new third edge 443.

Figure 11E:
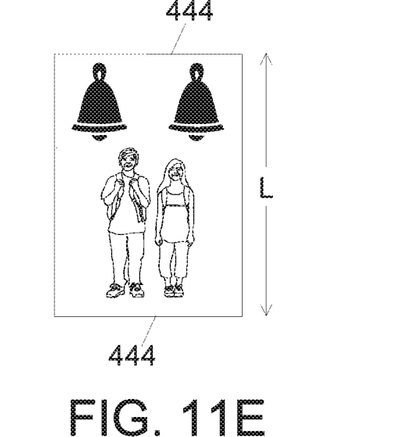

Then, the fourth periphery 434 may be trimmed off. This may be done by holding the first or third new edge 441, 442 flush against the trimmer's leveling guide edge 121, and trimming off the fourth periphery 434 at a location that gives the sheet 300 a predetermined length L. This leaves the sheet 300 as shown in FIG. 11E, with a new fourth edge 444. Alternatively, not all four peripheries might need to be removed. For example, only the first and second peripheries 431, 432, or only the first, second and third peripheries 431, 432, 433, might be removed.

In the trimming steps 207, 213 described above, some of the crop lines are not used as a guide for trimming. They are instead removed when the periphery they sit on is trimmed off, before they can be used for guiding the next trim step. Nevertheless, all of the crop lines may be printed onto the sheet 300, in order to give a person, who is doing the cropping, a choice of which crop lines to use. Also, all of the inner crop lines 321*v*, 321*h* may be used for checking for foil die alignment (step 211) even if only some of those crop lines are used as guides for cropping.

The components and procedures described above provide examples of elements recited in the claims. They also provide examples of how a person of ordinary skill in the art can make and use the claimed invention. They are described here to provide enablement and best mode without imposing limitations that are not recited in the claims. In some instances in the above description, a term is followed by a substantially equivalent term enclosed in parentheses.

The invention claimed is:

1. A method, comprising:
    storing, in a database, a design that includes
        (i) a print component and an inner crop mark that are configured to be printed, and
        (ii) a foil component configured to be foil-stamped; and
    printing the print component and the inner crop mark on a sheet to yield a printed sheet;
    foil-stamping, with a foil-press die, the foil component and a foil alignment mark onto the printed sheet, wherein the foil-press die is embossed with both the foil component and the foil alignment mark, and wherein the foil alignment mark is configured to be aligned with the inner crop mark
    determining a deviation of the foil alignment mark on the printed sheet from the inner crop mark on the printed sheet; and
    performing an adjustment, based on the deviation, to reduce the deviation.

2. The method of claim 1, wherein the adjustment is an adjustment of a position of the foil-press die.

3. The method of claim 1, wherein the adjustment is an adjustment of a component of a paper tray.

4. The method of claim 1, further comprising repeating the printing, foil-stamping, determining, and performing steps in order to further reduce the deviation.

5. The method of claim 1, wherein the deviation is an angular deviation.

6. The method of claim 1, further including trimming the printed sheet in accordance with the inner crop mark.

7. The method of claim 1, wherein the inner crop mark includes lines that identify locations of corners of an imaginary rectangle, and the method further includes, after the determining, trimming the printed sheet along a side of the imaginary rectangle.

8. The method of claim 7, wherein the lines include, at a corner of the rectangle, a vertical line and a horizontal line that define the location of the corner.

9. The method of claim 8, wherein each of the horizontal line and the vertical line extends from the corner in a direction away from the imaginary rectangle.

10. The method of claim 8, wherein each of the horizontal line and the vertical line is spaced from the corner and extends in a direction away from the imaginary rectangle and is collinear with an edge of the rectangle.

11. A method, comprising:
    storing, in a database, a design that includes
        (i) a print component, an inner crop mark, and an outer crop mark that are configured to be printed, and
        (ii) a foil component configured to be foil-stamped; and
    printing the print component and the inner crop mark and the outer crop mark on a sheet to yield a printed sheet;
    trimming the printed sheet as guided by the outer crop mark to yield a trimmed printed sheet that includes the inner crop mark; and
    foil-stamping, with a foil-press die, the foil component and a foil alignment mark onto the trimmed printed sheet, wherein the foil-press die is embossed with both the foil component and the foil alignment mark, and wherein the foil alignment mark is configured to be aligned with the inner crop mark.

12. The method of claim 11, wherein the outer crop mark includes lines that identify locations of corners of an imaginary rectangle, and the trimming includes trimming the sheet along a side of the imaginary rectangle.

13. The method of claim 12, wherein the lines include, at a corner of the rectangle, a vertical line and a horizontal line that define the location of the corner.

14. The method of claim 13, wherein each of the horizontal line and the vertical line extends from the corner in a direction away from the imaginary rectangle.

15. The method of claim 13, wherein each of the horizontal line and the vertical line is spaced from the corner and extends in a direction away from the imaginary rectangle and is collinear with an edge of the rectangle.

16. A method, comprising:
storing, in a database, a first design that includes
  (i) a print component, an inner crop mark, and an outer crop mark that are configured to be printed, and
  (ii) a foil component configured to be foil-stamped; and
storing, in the database, a second design that includes
  (i) a print component that differs from the print component of the first design,
  (ii) the same inner crop mark as the first design, and
  (iii) the same foil component as the first design; and
providing a foil-press die that is embossed with both the foil component and a foil alignment mark, wherein the foil alignment mark is configured to be aligned with the inner crop mark.

17. The method of claim 16, further comprising:
printing the print component and the inner crop mark of the first design on multiple first sheets to yield first printed sheets;
printing the print component and the inner crop mark of the second design on multiple second sheets to yield second printed sheets; and
foil-stamping, using the foil-press die secured to a foil press, the foil component and the foil alignment mark onto the first printed sheets and the second printed sheets in a single batch, before removing the foil-press die from the foil press.

18. The method of claim 17, further comprising:
determining, for each of the foil-stamped printed sheets, a deviation of the foil alignment mark on the respective printed sheet from the inner crop mark on the respective printed sheet.

19. The method of claim 18, further comprising, before the storing of the first and second designs:
receiving the print components of the first and second designs respectively from different first and second users over a network.

\* \* \* \* \*